(12) United States Patent
Chin et al.

(10) Patent No.: US 7,777,783 B1
(45) Date of Patent: Aug. 17, 2010

(54) MULTI-VIDEO NAVIGATION

(75) Inventors: Hu Chin, Fremont, CA (US); Ken Prayoon Cheng, Saratoga, CA (US)

(73) Assignee: Proximex Corporation, Sunnyvale, CA (US)

( * ) Notice: Subject to any disclaimer, the term of this patent is extended or adjusted under 35 U.S.C. 154(b) by 509 days.

(21) Appl. No.: 11/726,879

(22) Filed: Mar. 23, 2007

(51) Int. Cl.
H04N 5/232 (2006.01)
H04N 7/18 (2006.01)

(52) U.S. Cl. .................. 348/211.99; 348/153; 348/155; 348/159

(58) Field of Classification Search ......... 348/143–159, 348/211.11–211.14, 14.01–14.16
See application file for complete search history.

(56) References Cited

U.S. PATENT DOCUMENTS

| 7,023,913 | B1* | 4/2006 | Monroe .................. 375/240.01 |
| 7,058,204 | B2* | 6/2006 | Hildreth et al. ............. 382/103 |
| 7,116,353 | B2* | 10/2006 | Hobson et al. .............. 348/150 |
| 7,187,783 | B2* | 3/2007 | Moon et al. ................. 382/103 |
| 7,382,249 | B2* | 6/2008 | Fancella ..................... 340/541 |
| 7,384,590 | B2* | 6/2008 | Kelly et al. ................. 264/496 |
| 7,385,590 | B2* | 6/2008 | Millar et al. ................ 345/170 |
| 7,456,727 | B2* | 11/2008 | Pinter et al. ............ 340/286.02 |
| 7,522,186 | B2* | 4/2009 | Arpa et al. .................. 348/153 |
| 7,525,576 | B2* | 4/2009 | Kannermark et al. .... 348/222.1 |
| 2002/0097322 | A1* | 7/2002 | Monroe et al. .............. 348/159 |
| 2003/0202102 | A1* | 10/2003 | Shiota et al. ................ 348/159 |
| 2004/0001149 | A1* | 1/2004 | Smith ....................... 348/218.1 |
| 2005/0052532 | A1* | 3/2005 | Elooz et al. ................. 348/148 |
| 2005/0132414 | A1* | 6/2005 | Bentley et al. .............. 725/105 |
| 2006/0017807 | A1* | 1/2006 | Lee et al. ...................... 348/36 |
| 2006/0221184 | A1* | 10/2006 | Vallone et al. .............. 348/155 |
| 2006/0279628 | A1* | 12/2006 | Fleming .................... 348/143 |
| 2007/0146484 | A1* | 6/2007 | Horton et al. .............. 348/159 |
| 2008/0068464 | A1* | 3/2008 | Kitagawa et al. ........... 348/159 |
| 2008/0079554 | A1* | 4/2008 | Boice ........................ 340/436 |
| 2008/0106597 | A1* | 5/2008 | Amini et al. ................ 348/143 |
| 2008/0130949 | A1* | 6/2008 | Ivanov et al. ............... 382/103 |
| 2008/0218590 | A1* | 9/2008 | Park et al. ................... 348/143 |
| 2008/0292140 | A1 | 11/2008 | Morris et al. |
| 2010/0002082 | A1* | 1/2010 | Buehler et al. .............. 348/159 |

\* cited by examiner

*Primary Examiner*—Jason Chan
*Assistant Examiner*—Pritham Prabhakher
(74) *Attorney, Agent, or Firm*—Peters Verny, LLP

(57) ABSTRACT

A video tracking system includes a user interface configured to facilitate tracking of a target between video cameras. The user interface includes user controls configured to assist a user in selecting video cameras as the target moves between fields of view of the video cameras. These user controls are automatically associated with specific cameras based on a camera topology relative to a point of view of a camera whose video data is currently being viewed. The video tracking system further includes systems and methods of synchronizing video data generated using the video cameras and of automatically generating a stitched video sequence based on the user selection of video cameras. The target may be tracked in real-time or in previously recorded video and may be track forward or backwards in time.

8 Claims, 8 Drawing Sheets

MULTI-VIDEO NAVIGATION

BACKGROUND

1. Field of the Invention

The invention is in the field of video processing and more specifically in the field of managing data from multiple video sources.

2. Related Art

Remote cameras are commonly used to monitor events and provide security. The video output from these remote cameras may be recorded and/or monitored in real-time. When a large number of remote cameras are used at the same time, it can be difficult to monitor all of the cameras at once. Further, when a surveillance target moves from the field of view of one camera to the field of view of another camera, it can be difficult to follow the target, regardless of whether the images are viewed in real-time or are recorded. For example, it may require hours to track a person's route through a complicated facility such as an airport. By the time such tracking is complete, the value of the information obtained may be significantly reduced, e.g., the target may have left the facility or already accomplished some malevolent deed. There is, therefore, a need for improved systems and methods of managing video data.

SUMMARY

Various systems and methods of the invention are configured to facilitate tracking of a target between multiple video sources. These video sources may be real-time, e.g., live, and/or recorded. Tracking may be automated, semi-automated, or manual.

Various embodiments of the invention include a user interface configured for navigating between video sources, e.g., cameras. This user interface is supported by predetermined relationships between the video sources, and by various logic modules as further described herein. The user interface allows for tracking a target forward in time using live and/or recorded video. For example, in some embodiments, the user interface can be used to track a target using recorded video in an accelerated mode. In the accelerated mode, video is processed in a shorter time scale that it took to record. For example in the accelerated mode, 30 minutes of video may be viewed in at an accelerated rate, e.g, in less than 12 minutes, less than 10 minutes, less than 5 minutes, or less than 3 minutes. As such, a target can be tracked using recorded video from a time in the past to the present, e.g., until the target is located in real-time video.

The user interface may also be configured to track a target back in time using recorded video. For example, a target first identified in real-time video may be tracked back in time to determine where the target came from. A target identified in recorded video can be tracked both forward and backward in time.

During tracking of a target, video segments associated with the target are optionally stitched together into a sequence of video data. For example, as the target moves between video sources, data from these video sources can be spliced together to form a continuous video sequence. As is described further herein, this splicing process may occur automatically as a user tracks the target using the user interface.

Various embodiments of the invention include systems configured to receive video data from multiple sources, store the received video, display the received video, and process the received video. These systems may include an intermediate layer configured to receive different types of video data and convert the different types of video data into a default type. These systems may also include video sources, storage media, computing hardware, firmware, software, output devices, and/or the like, configured to process video data and support the user interface.

Various embodiments of the invention include a system comprising a first data storage configured to store a plurality of video data received from a plurality of video sources, respectively, a second data storage configured to store data representative of one or more camera topology between the plurality of video sources, the one or more camera topology being relative to viewpoints of the plurality of video sources, first logic configured to generate a user interface for display to a user, the user interface including a region to display the plurality of video data and a plurality of user inputs configured for the user to navigate between the plurality of video data based on the one or more camera topology, and second logic configured to select which member of the plurality of video data to display in the user interface responsive to the plurality of user inputs.

Various embodiments of the invention include a method comprising identifying a first member of a plurality of cameras, identifying a first topological relationship between the first member of the plurality of cameras and a second member of the plurality of cameras, identifying a second topological relationship between the first member of the plurality of cameras and a third member of the plurality of cameras, the first topological relationship and the second topological relationship being relative to a viewpoint of the first camera, presenting video data generated using the first member of the plurality of cameras in a user interface, the user interface including a first user control and a second user control, associating the second member of the plurality of cameras with the first user control based on the topological relationship between the first member of the plurality of cameras and the second member of the plurality of cameras, associating the third member of the plurality of cameras with the second user control based on the topological relationship between the first member of the plurality of cameras and the third member of the plurality of cameras, receiving a user selection of the first user control, presenting video data generated using the second member of the plurality of cameras in the user interface based on the received user selection, and associating the first user control and the second user control with members of the plurality of cameras based on topological relationships relative to a viewpoint of the second member of the plurality of cameras.

Various embodiments of the invention include a method comprising viewing first video data within a user interface, the first video data generated using a first member of a plurality of cameras, locating a target within the first video data, observing the target leave a field of view of the first member of the plurality of cameras in a first direction relative to a viewpoint of the first member of a plurality of cameras, or observing the target enter the field of view of the first member of the plurality of cameras from the first direction relative to a viewpoint of the first member of the plurality of cameras, selecting a second member of the plurality of cameras using a first user control associated with the first direction relative to a viewpoint of the first member of the plurality of cameras, and viewing second video data within the user interface, the second video data generated using the second member of the plurality of cameras. This method may further include observing the target leave a field of view of the second member of the plurality of cameras in a first direction relative to a viewpoint of the second member of a plurality of cameras, or observing the target enter the field of view of the second member of the plurality of cameras from the first direction relative to a viewpoint of the second member of a plurality of cameras, selecting a third member of the plurality of cameras using a user control associated with the first direction relative to a viewpoint of the second member of a plurality of cameras, and viewing third video data within the user interface, the third video data generated using the third member of the plurality of cameras.

Various embodiments of the invention include a method comprising receiving a user selection of first video data generated using a first camera, the first video data including a first time reference, receiving a user selection of second video data generated using a second camera, the second video data including a second time reference, automatically stitching the first video data to the second video data responsive to the user selection of the second video data and using the first time reference and the second time reference to form a chronological video sequence, and creating an index to the video sequence based on identities of the first camera and the second camera.

DETAILED DESCRIPTION

Tracking of a target between multiple video streams may be facilitated by a user interface configured to use relationships between the view of one camera and the views of other cameras according to a camera topology. The camera topology is based on spatial relationships between cameras relative to a view point of one of the cameras. This is in contrast to a spatial relationship that is defined relative to an external coordinate or orientation system.

Various embodiments of the invention include a user interface comprising spatially intuitive camera selection controls for navigating between cameras and the video data generated by these cameras. These camera selection controls are arranged within the user interface according to the camera topology. For example, as further described herein, if a target moves to the right out of the field of view of a first camera, a camera selection control disposed to the right of other camera selection controls can be used to select a second camera whose field of view is to the right of the field of view of the first camera.

Figure 1:
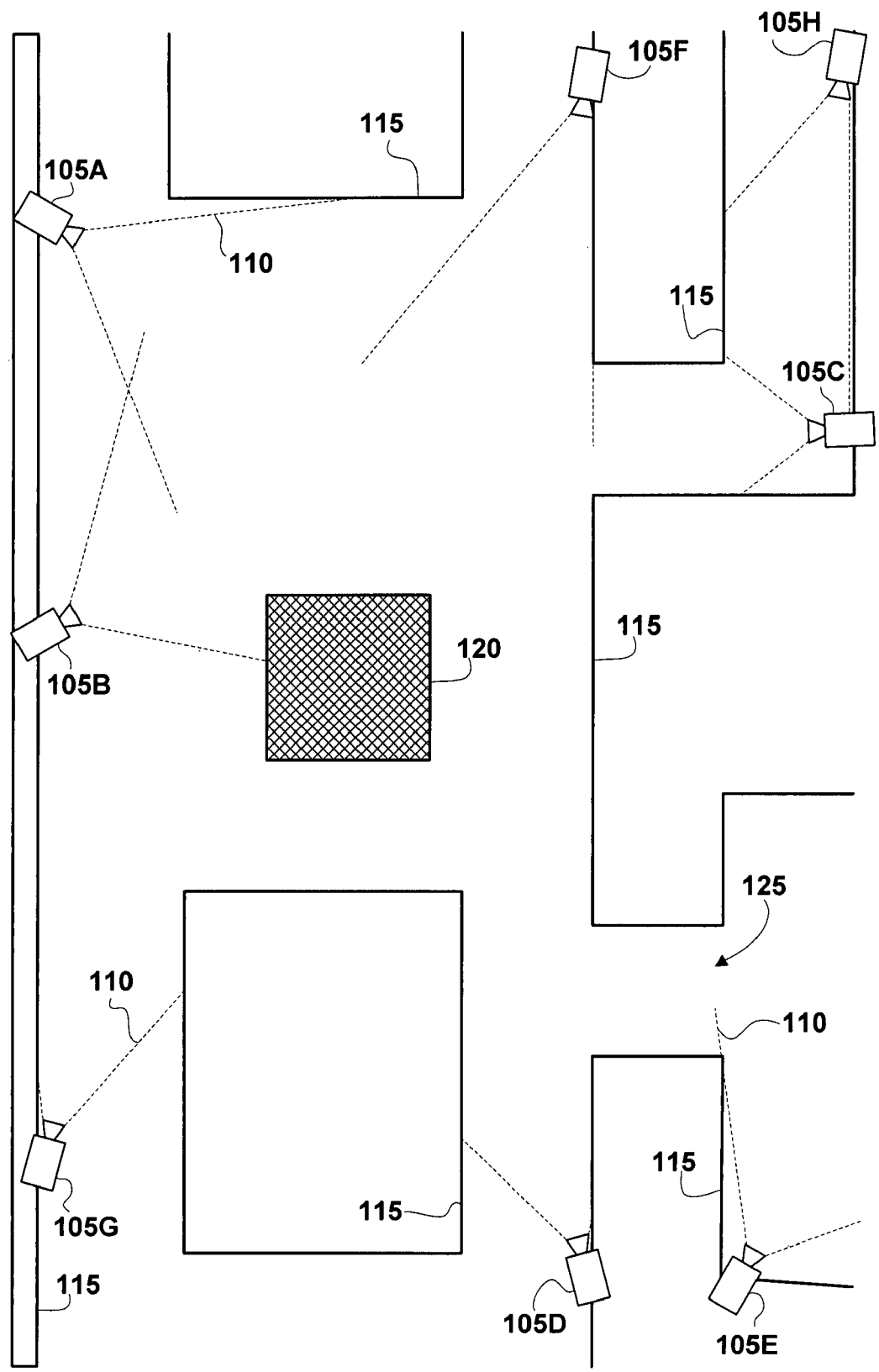
FIG. 1 illustrates a facility including a plurality of video cameras, according to various embodiments of the invention.

FIG. 1 illustrates an exemplary Facility generally designated 100 and including a plurality of Cameras 105. These Cameras 105 are individually designated 105A-105H. Each of Cameras 105 is associated with at least one field of view, illustrated using Dashed Lines 110 in FIG. 1. A member of Cameras 105 that is remotely movable may be associated with more than one field of view and, thus, more than one camera topology. Facility 100 includes Walls 115 and other Objects 120 that may define corridors, open areas, and the like. Objects 120 may include movable objects such as vehicles, curtains, inventory, temporary structures, signs, chattel, or the like. Walls 115 and Objects 120 may obscure the fields of view of Cameras 105. The Facility 100 illustrated in FIG. 1 is for illustrative purposes, one of ordinary skill in the art would understand that the various embodiments of the invention described herein may be adapted to a wide variety of facilities including airports, schools, government institutions, ports, ships, warehouses, military installations, power plants, transportation infrastructure, cities, and the like.

Some of the topological relationships between Cameras 105 in Facility 100 can be described as follows. Camera 105A is disposed to the left of Camera 105B and Camera 105B is disposed to the right of Camera 105A. These orientations are determined by facing in the directions of Cameras 105A and 105B, respectively, and observing the right or left location of the other camera. Camera 105C is disposed to the upper left of Camera 105A, and Camera 105A is disposed to the upper right of Camera 105C. Further, Camera 105F is disposed to the center of Camera 105B, and Camera 105B is disposed to the upper right of Camera 105F.

In some instances, the fields of view of different members of Cameras 105 overlap. For example, the fields of view of Cameras 105A and 105B overlap. Some parts of Facility 100 may not be included in the field of view of any of Cameras 105. For example, a Corridor 125 is disposed between fields of view of a Camera 105D and a Camera 105E.

Cameras 105 may include a variety of different camera types, having different focal lengths, resolutions, spectral sensitivity, movement capability, and output type. For example, members of Cameras 105 may be configured to generate analog video signals, or digital video data in a variety of formats. Members of Cameras 105 may be Pan-Tilt-Zoom (PTZ) cameras that are configured to be remotely controlled. Members of Cameras 105 may be portable and may include Global Positioning System (GPS).

Figure 2:
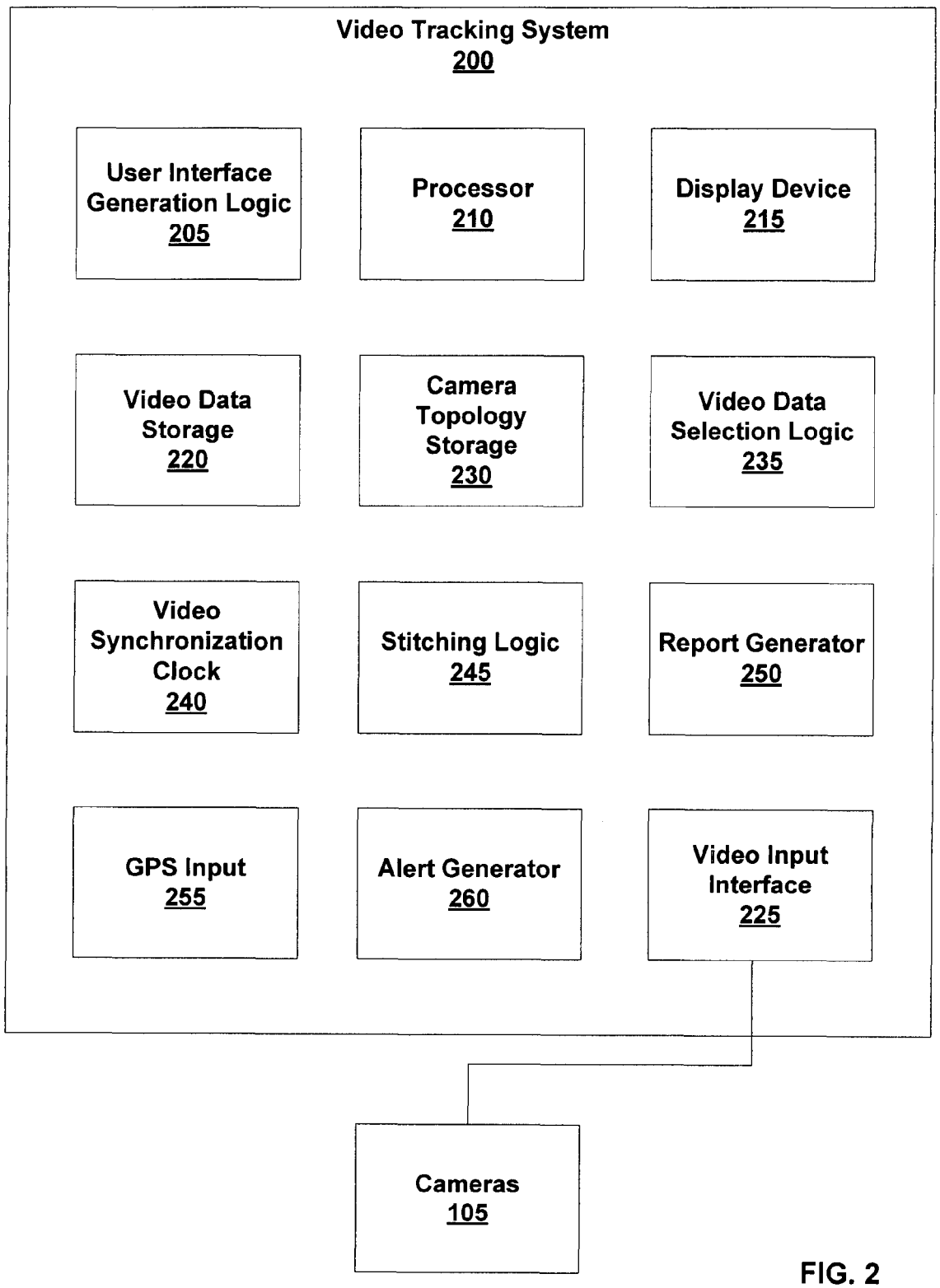
FIG. 2 is a block diagram of a video tracking system, according to various embodiments of the invention.

FIG. 2 is a block diagram of a Video Tracking System 200, according to various embodiments of the invention. Video Tracking System 200 includes logic and/or hardware configured for tracking a target using video data from Cameras 105. The logic may include hardware, firmware, and/or software stored on a computer readable medium. The hardware may include integrated circuits, a display device, cameras, data storage, and the like. For example, some embodiments include an integrated circuit configured to execute software to generate a user interface on a display device. The user interface is configured to display video stored in a storage device. As is further described herein, the user interface typically includes one or more user controls disposed within the user interface according to a camera topology.

In the embodiments illustrated by FIG. 2, Video Tracking System 200 includes a User Interface Generation Logic 205 configured to generate a user interface. User Interface Generation Logic 205 may include hardware, firmware, and/or software stored on a computer readable medium. For example, in some embodiments, User Interface Generation Logic 205 includes computing instructions configured to be executed by a Processor 210. Processor 210 may include a microprocessor, central processing unit (CPU), and/or the like. In some embodiments, Processor 210 is part of a personal computer or server.

Briefly, the output of User Interface Generation Logic 205 is configured to be presented as a user interface to a user via a Display Device 215, and may include images (e.g., video or still pictures), metadata, video control signals, links, and/or the like. The user interface is optionally presented in a graphical interface such as Microsoft Windows™ or OS 10 from Apple Computer. The user interface may include both features visible to the user and underlying functionality. Display device 215 may include one or more computer monitors, a liquid crystal display, a plasma display, and/or the like.

The user interface generated using User Interface Generation Logic 205 is configured to present video to the user. This video can be real-time (live) video or recorded video. For example, in some embodiments, the video presented includes live video received through members of Cameras 105. In some embodiments, the video presented includes video previously stored in a Video Data Storage 220. Video Data Storage 220 may include optical storage, a hard drive, static memory, random access memory, and/or other computer readable medium.

Video data received from Cameras 105 may be received through an optional Video Input Interface 225. Video Input Interface 225 is configured to receive video in a variety of formats and to convert the received video to a common format. For example, Video Input Interface 225 may be configured to receive video in analog formats such as RGB (red-gree-blue) or YPbPr (luma-blue-red), or digital formats such as MPEG1 (ISO: Moving Pictures Experts Group), MPEG2, MPEG4, H.261 (International Telecommunication Union), H.263, H.264, MJPEG, WMV (International Telecommunication Union), etc. and to convert the received video to MJPEG. Video Input Interface 225 optionally includes RCA, S-Video, DIN, DB25, USB, or Ethernet connectors configured to couple to different types of Cameras 105.

Video Input Interface 225 is optionally further configured to add time and source data to the received video data, and to store the received video data, with time and source data, in Video Data Storage 220. For example, the data stored in Video Data Storage 220 may include a data value indicating which of Cameras 105 the video data came from, as well as one or more time markers configured for associating different parts of the video data with a time of day. As is described further herein, the time markers may be used to temporally synchronize video data received from different members of Cameras 105.

Video Tracking System 200 further includes a Camera Topology Storage 230 configured to store the topological relationships between Cameras 105. As described elsewhere herein, these topological relationships are defined based on the point of view of each camera. These relationships are optionally established using a click-and-drag setup utility or may be automatically determined based on a mapping of camera locations and orientations.

Figure 3:
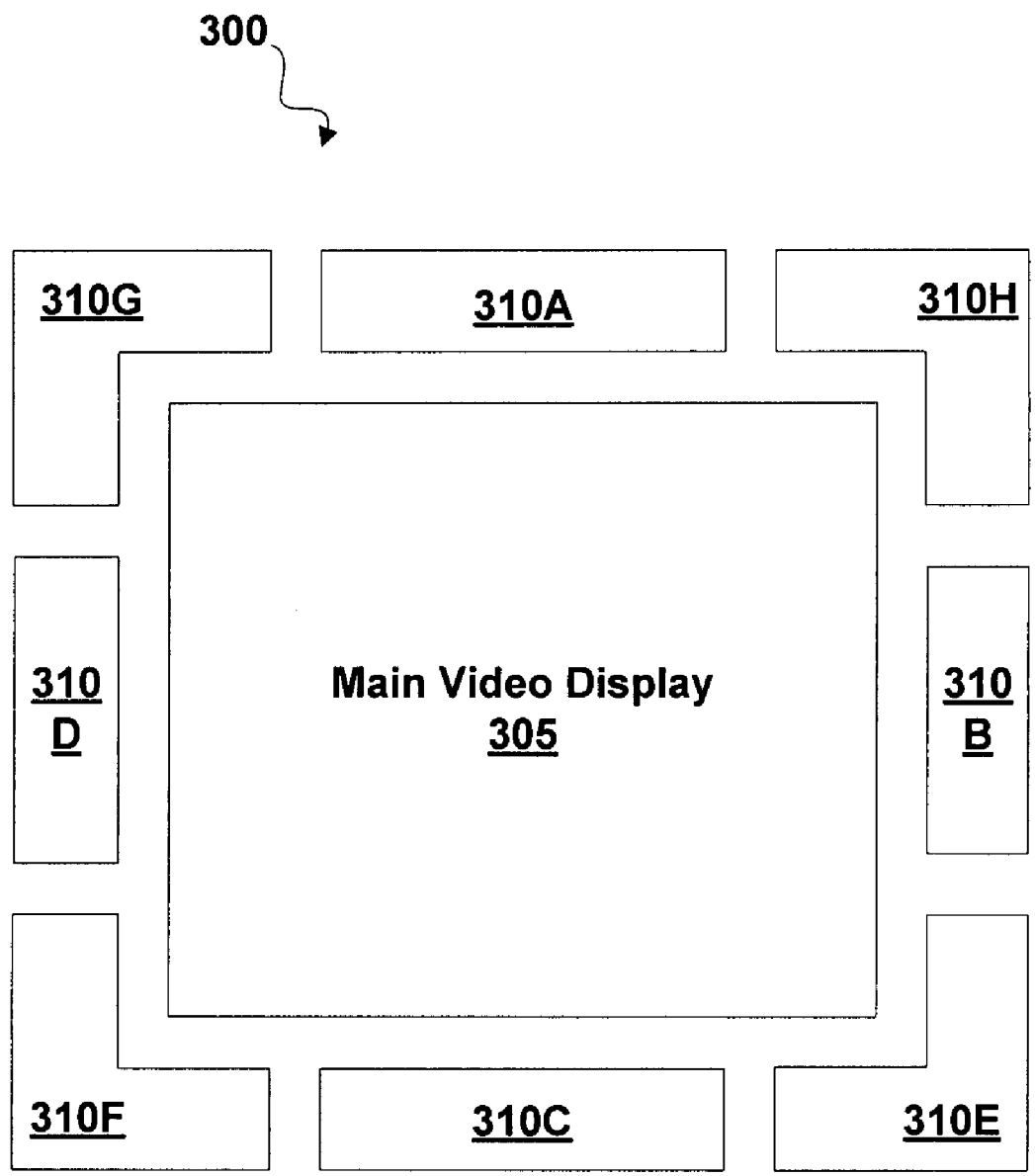
FIG. 3 illustrates an example of a user interface, according to various embodiments of the invention.

FIG. 3 illustrates an example of a user interface, Video Tracking Interface 300, as may be generated using User Interface Generation Logic 205, according to various embodiments of the invention. In these embodiments, Video Tracking Interface 300 includes a Main. Video Display 305 and a plurality of User Controls 310, individually designated 310A-310H. Main Video Display 305 is a part of Video Tracking Interface 300 configured to present video data to a user. The video data presented in Main Video Display 305 may be real-time video or video previously stored in Video Data Storage 220. The user may observe a target, e.g., a person or a vehicle, in the Main Video Display 305.

Each of User Controls 310 can be associated with a different member of Cameras 105, and is configured for a user to select between video data generated using these different members of Cameras 105. For example, if the user activates User Control 310A, video generated using a member of Cameras 105 that is associated with User Control 310A will be presented in Main Video Display 305. If the user activates User Control 310B, video generated using a member of Cameras 105 that is associated with User Control 310B will be presented in Main Video Display 305.

In various embodiments, the association of User Controls 310 with members of Cameras 105 based on camera topology results in an intuitive interface for tracking of targets between video camera. For example, if the target moves to the right out of the field of view presented in Main Video Display 305, then User Control 310B can be used to select the member of Cameras 105 whose field of view the target is most likely to be found next. As the target moves from camera to camera, a user can select those members of User Controls 310 adjacent to the edge of Main Video Display 305 at which the target disappeared.

The associations between User Controls 310 and different members of Cameras 105 are managed by Video Data Selection Logic 235 according to the topological relationships between Cameras 105 and according to which video data is currently being presented in Main Video Display 305. For example, if video data generated using Camera 105B (see FIG. 1), is currently being displayed in Main Video Display 305, then the topological relationships will include that Cameras 105G and 105D are to the right, with Camera 105D being more the upper right and Camera 105G more to the lower right. Likewise, Camera 105A is to the lower left, Camera 105F is directly ahead, and Camera 105C is to the upper right.

Video Data Selection Logic 235 is configured to use these relationships to associate members of User Controls 310 to specific members of Cameras 105 such that the spatial distribution of User Controls 310 within Video Tracking Interface 300 is mapped to the topological relationships between cameras. Thus, since Camera 105A is to the left of Camera 105B, when video generated using Camera 105B is displayed in Main Video Display 305, User Control 310D will be associated with Camera 105A. Likewise, User Control 310G (and/or 310A) will be associated with Camera 105F, User Control 310B will be associated with Camera 105D, User Control 310H will be associated with Camera 105C, and User Control 310E will be associated with Camera 105G.

Some of User Controls 310 may not be associated with members of Cameras 105. For example, when video generated using Camera 105B is displayed in Main Video Display 305, User Control 310F is not associated with a member of Cameras 105 because there is no camera to the lower left from the point of view of Camera 105B. User Control 310F is optionally, grayed out, absent, or otherwise configured to indicate the lack of association with a member of Cameras 105. For example, in some embodiments, the appearance of members of User Controls 310 is dependent on whether or not they are associated with a source of video data. In some embodiments, the sizes, shapes and/or positions of User Controls 310A-310H may change based on the availability of Cameras 105 in the current camera topology. For example, if there is only one of Cameras 105 to the left, then User Control 310D may extend along the entire left edge of Main Video Display 305. More than one member of User Controls 310 may be associated with the same member of Cameras 105.

Video Data Selection Logic 235 is configured to change the video data presented in Main Video Display 305 if a user activates one of User Controls 310. The video data presented is that that is or was generated using the member of Cameras 105 that is associated with the activated member of User Controls 310. For example, if User Control 310G is associated with Camera 105F, then activation of User Control 310G will result in presentation of video data generated using Camera 105F in Main Video Display 305.

Video Data Selection Logic 235 is configured to change to the associations between User Controls and members of Cameras 105 when a member of User Controls 310 is activated. For example, if a member of User Controls 310 associated with Camera 105F is activated, in addition to the presentation of different video data in Main Video Display 305, members of User Controls 310 are re-associated with members of Cameras 105 according to the camera topology of Camera 105F. Specifically, since Camera 105A and Camera 105B are to the right and upper right, respectively, of Camera 105F, Camera 105A may be associated with User Control 310B and Camera 105B may be associated with User Control 310H. Likewise, Camera 105D may be associated with User Control 310G, and Camera 105C may be associated with User Control 310D. Each time the source of the data presented in Main Video Display 305 is changed, one or more of the associations between members of User Controls 310 and Cameras 105 may automatically be changed.

While the embodiments of Video Tracking Interface 300 illustrated include eight User Controls 310, (310A-310H), alternative embodiments may include different numbers of User Controls 310. For example, some embodiments include four User Controls 310, one on each side, one below and one above Main Video Display 305. Some embodiments include more than eight User Controls 310, for example, in situations where a target may move up or down (e.g., using stairs), as well as directly toward or away from a member of Cameras 105, additional user controls may be used to track a target moving in these directions. In one embodiment, an additional member of User Controls 310 is dedicated for association with an "Exit Door." In one embodiment, User control 310A is configured to track a target moving up and User Control 310C is used to track a target moving down. A ninth and tenth member of User Controls 310 are used to track a target moving directly away and toward the camera. These additional User Controls 310 are illustrated, for example, in FIG. 5 below.

User Controls 310 can be selectable (clickable or touch sensitive) images shown on Display Device 215 or may include physical buttons disposed around Display Device 215. When User Controls 310 are shown on Display Device 215, they are optionally incorporated within Main Video Display 305. In these embodiments, Main Video Display 305 may be divided up into parts such that clicking on these parts results in the activation of User Controls 310.

Figure 4A:
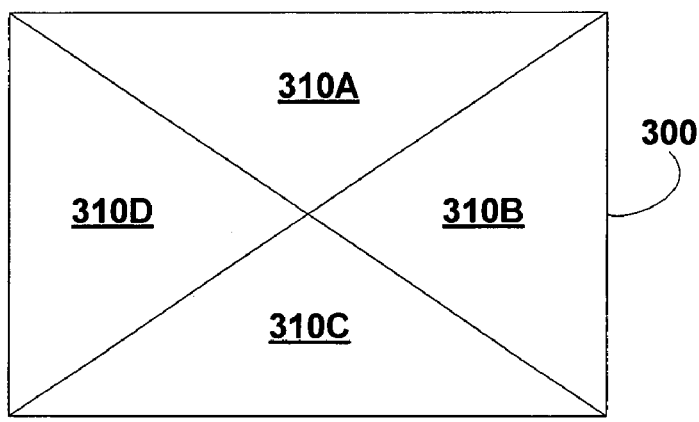
FIGS. 4A-4C illustrate several ways in which a video display may be divided into selectable regions, according to various embodiments of the invention.
Figure 4B:
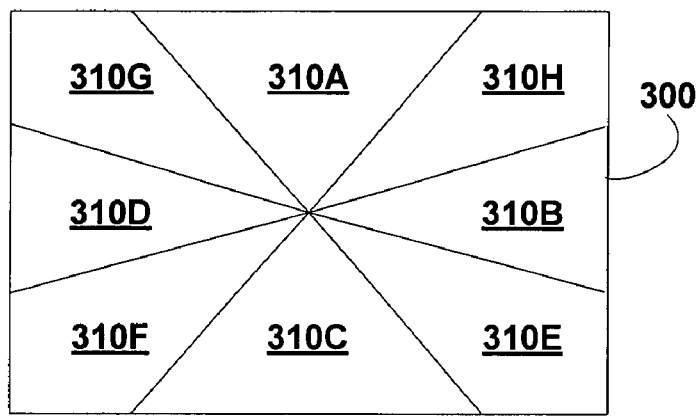
Figure 4C:
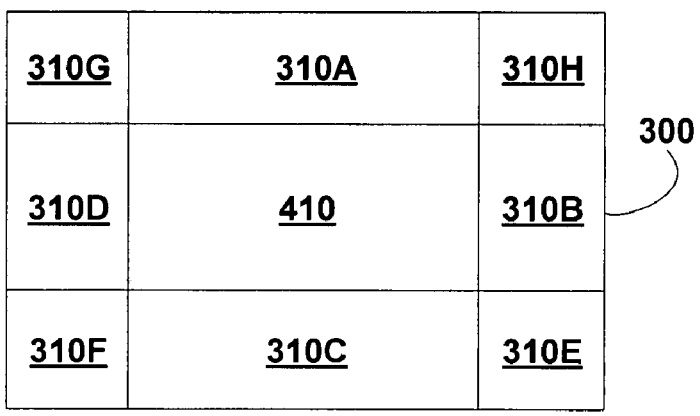

FIGS. 4A-4C illustrate several ways in which Main Video Display 305 may be divided into selectable regions, according to various embodiments of the invention. In FIG. 4A four regions are defined. In FIG. 4B eight regions are defined. In FIG. 4C nine regions are defined, including a Central Region 410. The regions labeled 310A-310H operate as User Controls 310. Central Region 410 may operate as an additional member of User Controls 310, and may be associated with a camera topology for a direction directly away in the viewpoint of the camera whose video data is currently being presented in Main Video Display 305. As described elsewhere herein, additional User Controls 310, associated with camera topologies for directions directly away or directly toward the viewpoint of the camera may be disposed outside Main Video Display 305.

In alternative embodiments, User Controls 310 are disposed in one or more groups beside Main Video Display 305 rather than surrounding Main Video Display 305. In these embodiments, User Controls 310A-310H may still be spatially arranged within the one or more groups so as to indicate their functionality and relationship to camera topology.

In some embodiments, a member of User Controls 310 is associated with more than one member of Cameras 105. For example, when data generated using Camera 105F is being displayed in Main Video Display 305, User Control 310D may be associated with both Camera 105C and Camera 105D. When a member of User Controls 310 having multiple associations is selected by a user, the user may be presented with a list of alternative members of Cameras 105 from which to choose. For example, in some embodiments, the user is presented with a group of thumbnails showing video data generated by each of the members of Cameras 105 that is associated with the selected member of User Controls 310. In some embodiments, the list of alternative members of Cameras 105 is ordered based on a prediction of which member of Cameras 105 is most likely to be wanted by a user. For example, it may be determined by Video Data Selection Logic 235 that when a target moves to the left from the field of view of Camera 105F there is a 33 percent chance that the user will be observed next in the field of view of Camera 105D and a 66 percent chance that the user will be observed next in the field of view of Camera 105C. Presentation of alternative members of Cameras 105 may be useful, particularly when an environment changes. For example, movement of Objects 120 may block one member of Cameras 105 and, thus, make another member preferable for viewing.

In some embodiments, each of User Controls 310 includes a thumbnail of video data generated using the respective associated member of Cameras 105. For example, when Video Tracking Interface 300 is displayed on a computer monitor, each of User Controls 310A-310H may be represented by a video thumbnail. In some embodiments, Video Tracking Interface 300 is configured such that moving a cursor over one of User Controls 310A-310H will result in displaying of video data generated using the associated member of Cameras 105. This video data may be displayed as a thumbnail or in a region of Video Tracking Interface 300 other than Main Video Display 305.

Returning to FIG. 2, a Video Synchronization Clock 240 is configured to synchronize video data generated using different members of Cameras 105. As discussed elsewhere herein, the video data stored in Video Data Storage 220 includes information identifying which of Cameras 105 the video data was generated by and time information relating the video data to a time of day, or similar time reference. The time information is used by Video Data Selection Logic 235 and Video Synchronization Clock 240 to move between video data from different sources in a time synchronized manner. For example, if a user is viewing data generated using Camera 105G in Main Video Display 305 and then uses User Control 310B to select data generated using Camera 105D, then data generated using Camera 105D will be presented in Main Video Display 305 and the part of the data generated using Camera 105D presented will be that part that is adjacent in time to the video data just viewed from Camera 105G.

In a more specific example, if a user begins watching video data from Camera 105G that was recorded at 1:00, watches for 5 minutes until 1:05, and then switches to watching video data from Camera 105D, then the data presented in Main Video Display 305 will be that data recorded at 1:05 using Camera 105D. Likewise, if a user begins watching video data from Camera 105G that was recorded at 1:00, watches backwards in time (showing the video data in reverse) until 12:55, and then switches to watching video data from Camera 105D, then the data presented in Main Video Display 305 will be that data recorded at 12:55 using Camera 105D. Typically, because the video data from Camera 105G was being shown in reverse and the data from Camera 105D will also be shown backwards in time, although the user may reverse direction of the viewing of video data.

The synchronization between video data optionally includes an offset selected to approximate the time a target would be expected to travel between members of Cameras 105. For example, if a typical travel time between the fields of view of Cameras 105G and 105D is 15 seconds, then a 15 second offset is optionally automatically used when synchronizing video data from Camera 105G and Camera 105D. If a user is viewing video data from Camera 105G in Main Video Display 305, and uses User Control 310B to select video data generated by Camera 105D starts by viewing video data generated using Camera 105D, then the video from Camera 105D will be offset by 15 seconds. This offset may enable the user to see the target immediately in the field of view of Camera 105D without having to wait for the target to travel between fields of view.

A synchronization offset may also be used when presenting video data within thumbnails. For example, if User Control 310B includes a thumbnail of video data generated using Camera 105D, while video data from Camera 105G is displayed in Main Video Display 305, then the video shown in the thumbnail may be offset by 15 seconds from the video presented in Main Video Display 305.

Referring again to FIG. 2, Video Tracking System 200 optionally includes a Stitching Logic 245 configured to form a video sequence out of video data generated using more than one member of Cameras 105. The video sequence includes video data from different members of Cameras 105 in a chronological order. The video sequence may be automatically generated as a target is tracked using Video Tracking System 200. For example, as a user uses User Controls 310 to select which video data to present in Main Video Display 305, the presented video data may be automatically included in a stitched video sequence. In some embodiments, the stitched sequence includes a copy of the video data configured in a sequential video file. In some embodiments, the stitched sequence includes a series of pointers, e.g., file names and time references, to other files and the video data included of the stitched sequence need not be stored as a single unit.

A video sequence may include video presented forward and/or backwards in time, and may include time reversals. For example, a video sequence may include video data generated using Camera 105A viewed backwards in time stitched to video data generated using Camera 105D. The video data generated using Camera 105D, as included in the video sequence, may include a time reversal, e.g., where a user started watching the video data backward in time and changed the temporal direction of the video data presentation to watch the same video data forwards in time. The sequence may next include video data generated using Camera 105E viewed forward in time. Such video sequences may be useful for tracking a first target back in time until some event occurs and then tracking a second target forward in time following the event.

In some embodiments, Stitching Logic 245 is configured to automatically index the stitched video sequence using camera identification information and/or thumbnail stills of the video sequence. This index may be used to navigate forward and back in time within the video data. For example, if a user is tracking a target using recorded video data and the target travels an unexpected route such that the target does not appear in video data generated using a member of Cameras 105 selected using User Controls 310, then the user can use the stitched sequence to backtrack and re-acquire the target. Thus, Stitching Logic 245 is optionally configured for editing, correcting and reorganizing video sequences.

An optional Report Generator 250 is configured to generate a report using data generated by Video Tracking System 200. For example, in some embodiments, Report Generator 250 is configured for generating a listing of areas through which a target travels based on which members of Cameras 105 are used to track the target. In some embodiments, Report Generator 250 is configured to automatically include a series of thumbnails in an electronic document. These thumbnails may be indexes to a video sequence generated using Stitching Logic 245 and may include links to the video sequence.

In some embodiments, Video Tracking System 200 includes a GPS (global positioning system) Input 255 configured to receive location and optional orientation information from a camera, such as a member of Cameras 105. For example, GPS Input 255 may be configured to receive information regarding the location of a portable member of Cameras 105. This information may be generated using a GPS system, a local positioning system, a radio triangulation system, an inertia measurement device, and/or other position sensing system. GPS Input 255 is not limited to receiving position information from positioning systems that are global. The optional orientation information is configured for determining a direction in which the camera is pointed. Video Data Selection Logic 235 may use the location and orientation information to determine topological relationships between a portable member of Cameras 105 and fixed members of Cameras 105. These topological relationships are optionally determined in real-time and updated as the portable camera is moved. The portable camera may be included in a cellular telephone, personal digital assistant, communication device, or the like. GPS Input 255 may include a wireless receiver, a universal serial bus, a powerline communication system, a network adaptor, and/or the like.

Figure 5:
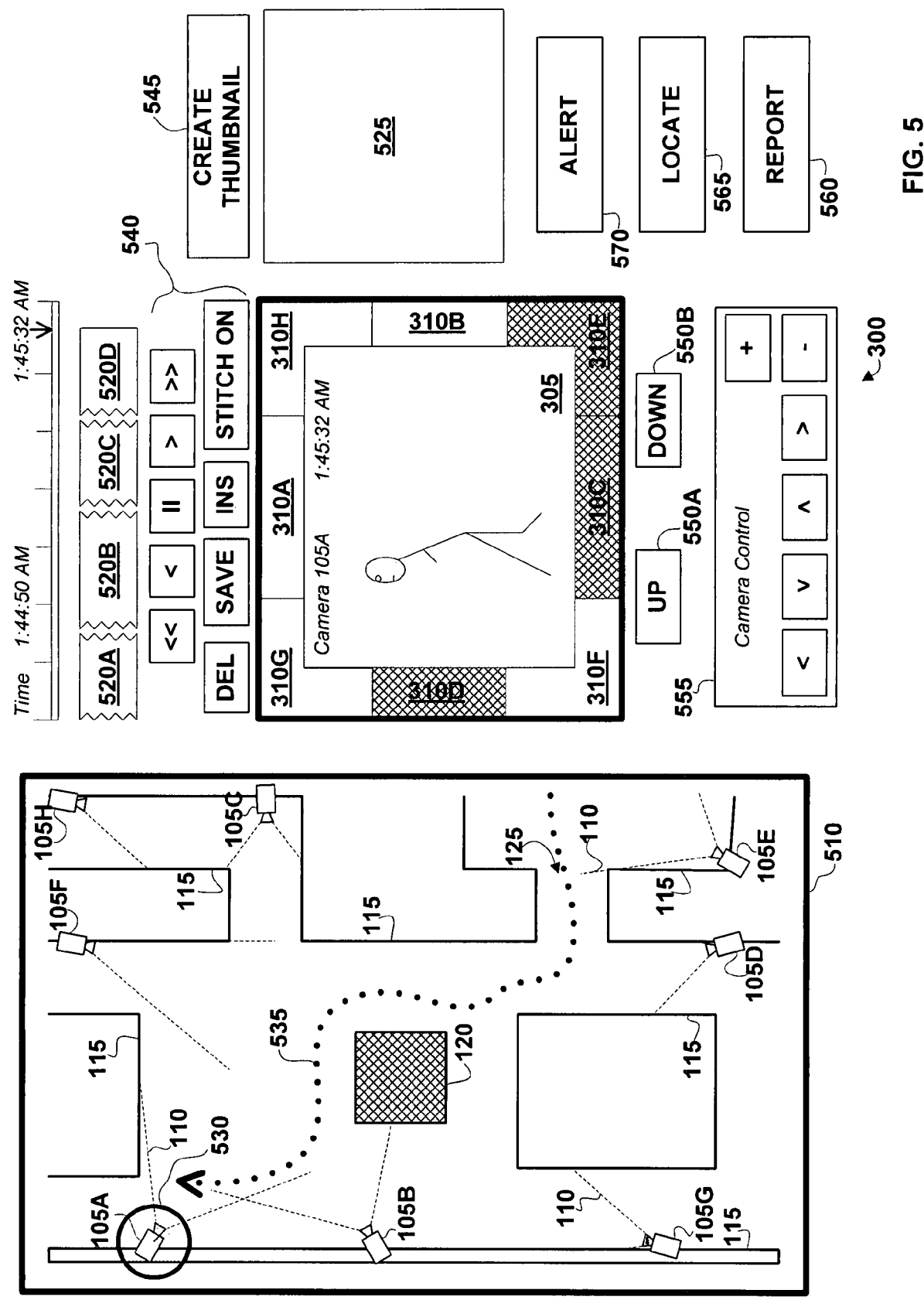
FIG. 5 illustrates alternative embodiments of a video tracking interface.

FIG. 5 illustrates alternative embodiments of Video Tracking Interface 300 including an interactive Map 510 of Facility 100, a stitched sequence represented by Sequence Thumbnails 520A-520D, a Preview Thumbnail 525, and various additional user controls. The various features illustrated in FIG. 5 may be included in alternative combinations and/or arrangements in alternative embodiments of the invention. In the embodiments illustrated, some members of User Controls 310A-310H are grayed out because there are currently no members of Cameras 105 associated with these controls. For example, from the point of view of Camera 105A there is no camera to associate with User Control 310D.

Map 510 is configured to show a user which of Cameras 105 is currently active in Main Video Display 305. For example, in the embodiment illustrated, a Circle 530 is used to indicate that data from Camera 105A is currently being presented in Main Video Display 305. Circle 530 is optionally brightly colored or flashing. Circle 530 may move to mark a different member of Cameras 105 when a user selects video data from the different member of Cameras 105. Map 510 optionally further includes a Path Indicator 535 representative of a path taken by a target through Facility 100.

Sequence Thumbnails 520A-520D are an index to a video sequence generated as a target travels through Facility 100. This video sequence is optionally generated automatically in response to a user's operation of User Controls 310, as described elsewhere herein. Each of Sequence Thumbnails 520A-520D includes a still image and is associated with at least one time point and a member of Cameras 105. The video sequence can be navigated by selecting one of the Sequence Thumbnails 520A-520D. For example, clicking on Sequence Thumbnail 520B may cause a part of the video sequence generated using Camera 105D at time 1:44:50 to be presented in Main Video Display 305. The video sequence represented by Sequence Thumbnails 520A-520D may also be navigated and edited using Sequence Controls 540.

Sequence Thumbnails 520A-520C may be generated automatically each time data from a different member of Cameras 105 is presented in Main Video Display 305 or by selecting a Create Thumbnail Control 545. For example, if a user observes a particular event to be documented, the user can use Create Thumbnail Control 545 to index the video sequence at the time of that event. Thumbnails can be created for both real-time and previously recorded video.

Preview Thumbnail 525 may be used to view video generated by a member of Cameras 105. For example, in some embodiments, moving a cursor over a member of User Controls 310 will cause video generated by an associated member of Cameras 105 to be presented in Preview Thumbnail 525. Some embodiments include a plurality of Preview Thumbnail 525.

Video Tracking Interface 300 optionally further includes additional User Controls 550A and 550B, configured for tracking a target up or down relative to the viewpoint of a member of Cameras 105. For example, as discussed elsewhere herein, these controls may be used for tracking a target up and down stairs.

Video Tracking Interface 300 optionally further includes Camera Movement Controls 555 configured to operate a movable (e.g., PTZ) camera. Typically, Camera Movement Controls 555 are automatically associated with whichever member of Cameras 105 is currently being used to generate video data presented in Main Video Display 305.

Video Tracking Interface 300 optionally includes a Report Generation Control 560 configured to execute a report generation utility. The report generation utility may automatically include video sequences, thumbnails, or other data generated using Video Tracking Interface 300. For example, in some embodiments report generation utility includes a template to which a user can add notes to thumbnails.

Video Tracking Interface 300 optionally includes a Camera Locate Control 565. Camera Locate Control 565 is configured to determine a location of a portable member of Cameras 105, and optionally to display the determined location on Map 510. Similar features may be used to locate other objects and/or security personnel.

Video Tracking Interface 300 optionally includes an Alert Activation Control 570. In various embodiments, activating Alert Activation Control 570 triggers alarms, logging and/or various actions according to pre-established procedures. These procedures may be defined by a set of rules and be performed by a rule engine (not shown) included in Video Tracking System 200. The rules may define a workflow to be performed in response to an alert, automatic indexing of the video data being observed when Alert Activation Control 570 is selected, automatic generation of a report or opening of a report template, etc. For example, if a user observes tailgating in a video, the user can select Alert Activation Control 570 to index the video data and enter notes regarding the event in a report template. These notes may include identities of the parties involved in the tailgating, where it occurred, how many people were involved, what action was taken, etc. In one embodiment, the report will automatically include video data recorded 5 seconds before and 5 seconds after the event.

The various features illustrated in FIG. 5 are typically supported by underlying logic and/or hardware configured to perform associated operations. This underlying logic may be part of Video Tracking System 200. For example, Camera Locate Control 365 may be supported by GPS Input 255 and logic configured to map a location to Map 510. Camera Movement Controls 555 may be supported by logic that automatically associates the controls with one of Camera 105 responsive to User Controls 310A-310H.

Figure 6:
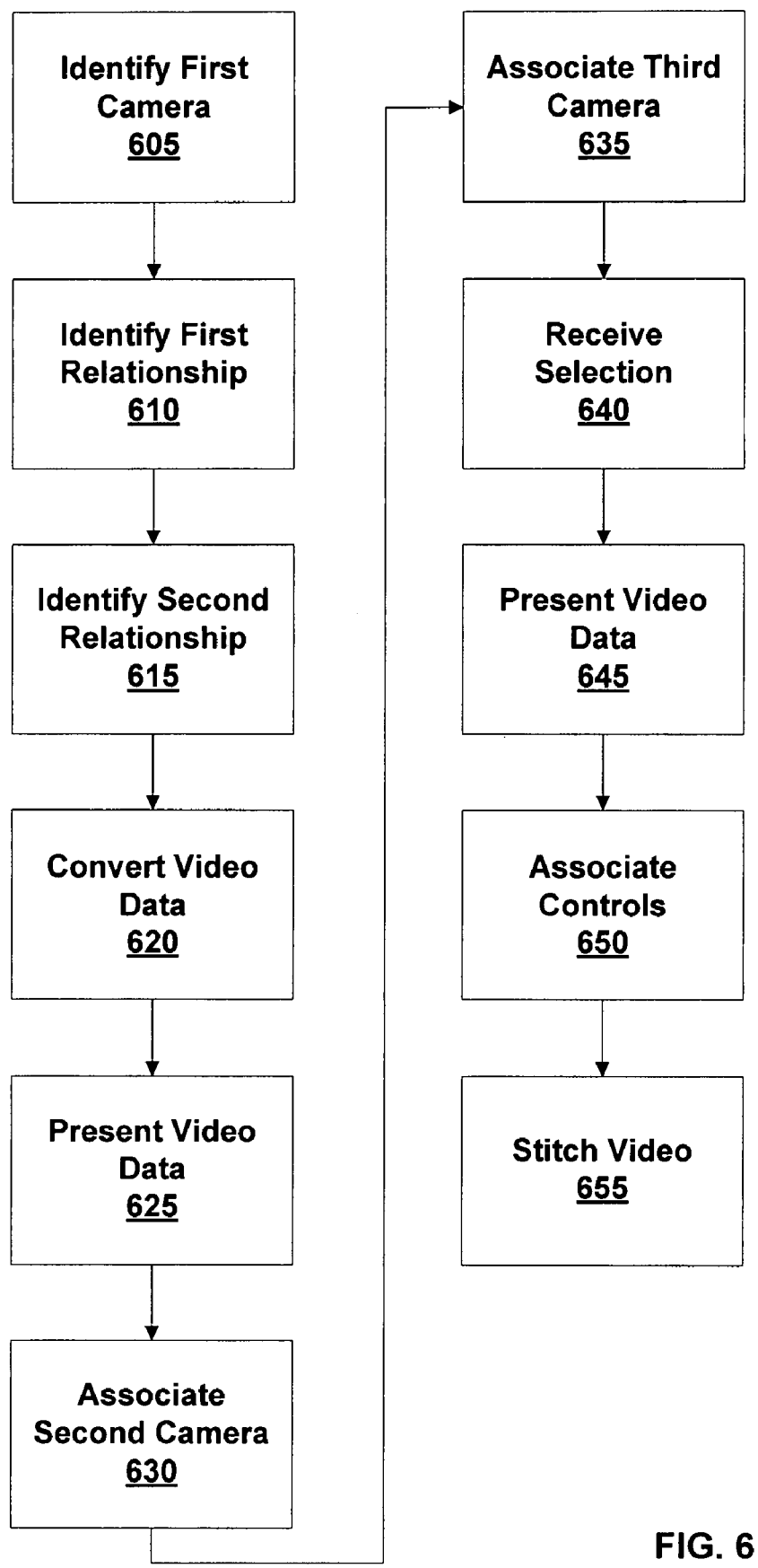
FIG. 6 illustrates methods of presenting video data in a user interface, according to various embodiments of the invention.

FIG. 6 illustrates methods of presenting video data in a user interface, according to various embodiments of the invention. In this method topographical relationships are identified between a first member of Cameras 105 and other members of Cameras 105, video data from the first member of Cameras 105 is optionally converted into a required format and presented in Video Tracking Interface 300, members of User Controls 310 are associated with the other members of Cameras 105, one of the User Controls 310 is selected, video data from a second member of Cameras 105 is presented in Video Tracking Interface 300, and the User Controls 310 are again associated with members of Cameras 105. Optionally, video data from the first member and second member of Cameras 105 is stitched together to generate a video sequence.

More specifically, in an Identify First Camera Step 605, a first member of Cameras 105 is identified. This camera may be, for example, Camera 105A as illustrated in FIG. 5.

In an Identify First Relationship Step 610, a first topological relationship between the member of Cameras 105 identified in Identify First Camera Step 605 and a second member of Cameras 105 is identified. For example, if the second member of Cameras 105 is Camera 105B, the topological relationship may include that the second member is to the right of the first member. This first topological relationship is relative to the viewpoint of the first member of Cameras 105, e.g., Camera 105A.

In an Identify Second Relationship Step 615, a second topological relationship between the first member of Cameras 105 and a third member of Cameras 105 is identified. For example, if the third member of Cameras 105 is Camera 105F, then the topological relationship may include that the third member is to the left of the first member. The second topological relationship is relative to the viewpoint of the first member of Cameras 105.

In an optional Convert Video Data Step 620, video data received from the first member of Cameras 105 is converted into a desired format. This conversion may be performed using Video Input Interface 225, and may include associating camera identification information and time reference information with the video data. As is described elsewhere herein, Video Input Interface 225 may be configured to convert video data from a variety of formats to a common format.

In a Present Video Data Step 625, video data generated using the first member of Cameras 105, identified in Identify First Camera Step 605, is presented in Main Video Display 305. This video data may be real-time video data, or previously recorded video data stored in Video Data Storage 220.

In an Associate Second Camera Step 630, a second member of Cameras 105 is associated with a first member of User Controls 310. For example, if the first member of Cameras 105 is Camera 105A, then Camera 105B may be associated with User Control 310B. The association is typically based on the topological relationship between the first member of Cameras 105 and the second member of Cameras 105, as identified in Identify First Relationship Step 610. For example, if the topological relationship includes that the second member is to the right of the first member, then a member of User Controls 310 to the right (e.g., User Control 310B) is associated with the second member of Cameras 105.

In an Associate Third Camera Step 635, a third member of Cameras 105 is associated with a second member of User Controls 310. This association is typically based on the topological relationship between the first member of Cameras 105 and the third member of Cameras 105 as identified in Identify Second Relationship Step 615. The first and second members of User Controls 310 are optionally presented in Video Tracking Interface 300 in a spatial arrangement representative of the first topological relationship and the second topological relationship.

In a Receive Selection Step 640, a user selection of one of User Controls 310 is received. This selection may be the result of a button being pressed, a click in Video Tracking Interface 300, or the like. Sometimes, the selection is made as the result of a target leaving a field of view associated with the first member of Cameras 105. For the sake of illustration, it is assumed that the selected member of User Controls 310 is the second member of User Controls 310.

In a Present Video Data Step 645, video data generated using the member of Cameras 105 selected in Receive Selection Step 640 is presented in Main Video Display 305. For example, if the selected member of User Controls 310 is the second member of User Controls, e.g., User Control 310B, then video data generated using the second member of Cameras 105 is presented. This video data may be real-time video data, or previously recorded video data stored in Video Data Storage 220.

In an Associate Controls Step 650, the first member of User Controls 310 and the second member of User Controls 310 are again associated with members of Cameras 105. These associations are based on topological relationships relative to a viewpoint of the member of Cameras 105 selected in Receive Selection Step 640. For example, if the member of Cameras 105 selected in Receive Selection Step 640 is Camera 105B, then User Control 310D may be associated with Camera 105A, User Control 310E may be associated with Camera 105G, etcetera.

In an optional Stitch Video Step 655, video data presented in Present Video Data Step 625 and video data presented in Present Video Data Step 645 are stitched together to form a video sequence. Stitch Video Step 655 is optionally performed automatically in response to Receive Selection Step 640. Further details of stitching video data to form a video sequence are discussed elsewhere herein. Stitch Video Step 655 optionally includes indexing of the video sequence and/or generation of thumbnails configured for navigating the video sequence. These Thumbnails may be presented in Video Tracking Interface 300.

Figure 7:
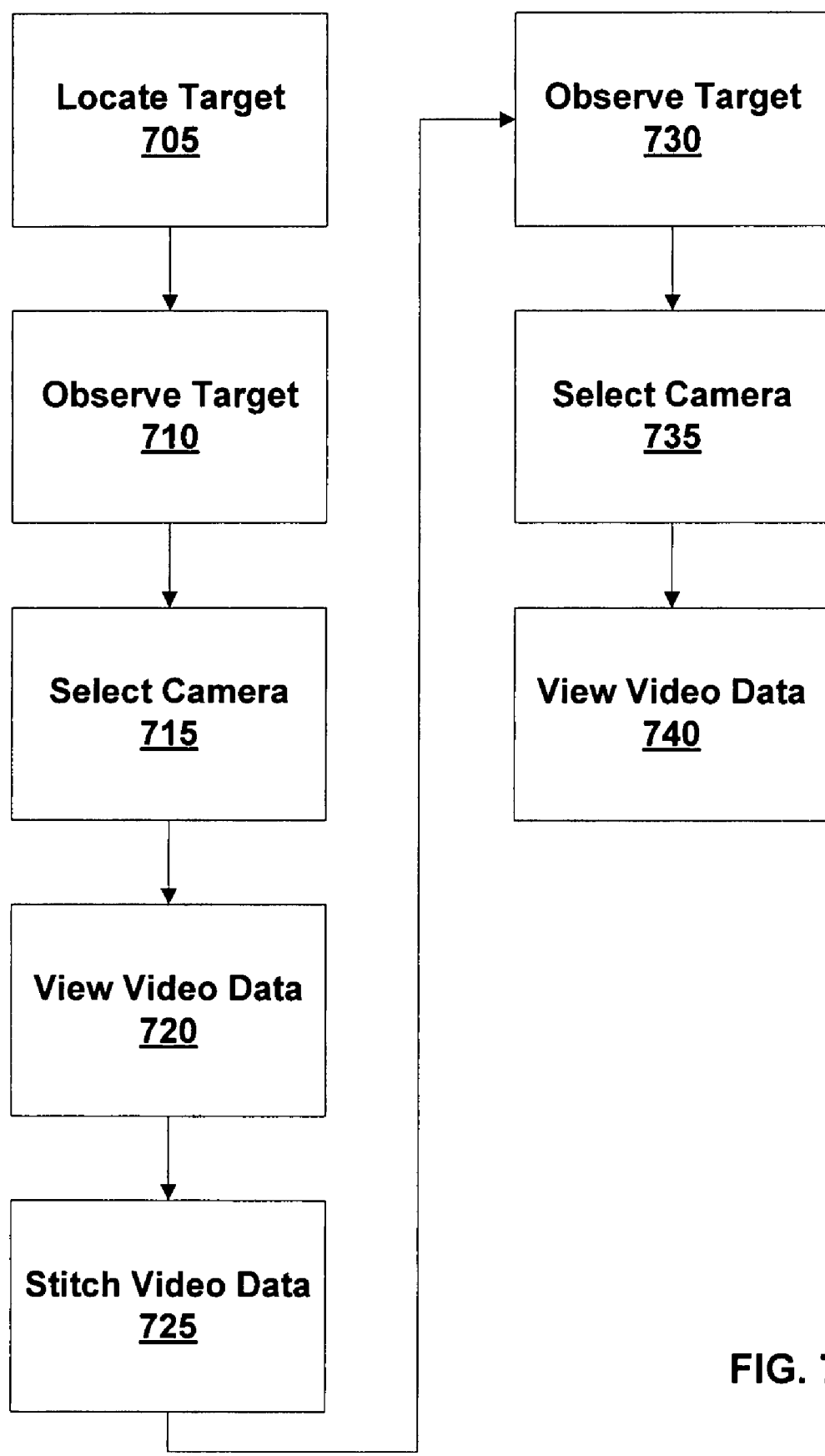
FIG. 7 illustrates methods of tracking a target according to various embodiments of the invention.

FIG. 7 illustrates a method of tracking a target according to various embodiments of the invention. In this method a target is first located in video data generated using a first member of Cameras 105. When the target leaves the field of view of the first member of Cameras 105, a second member of Cameras 105 is selected using User Controls 310 and the target is again observed using video data generated using the second member of Cameras 105. This process may be repeated using a third member of Cameras 105.

The methods illustrated by FIG. 7 may include live video, recorded video presented to a user in real-time, or recorded video presented at a rate faster than real time, e.g. in an accelerated mode. Further, the video may be viewed forward or backwards in time. In some embodiments, the direction of video presentation is different in different steps of FIG. 7. For example, the target observed may include more than one person or object. A first person may be observed in real-time video, tracked back in time until the first person meets a second person, and then the second person is tracked forward in time until the second person is viewed in real-time.

Typically, the video data from different members of Cameras 105 is presented to a user for viewing in a synchronized manner. As such, the user can move from one camera to another while viewing video data that is approximately continuous in time. As video data from different sources is viewed, the video data is optionally automatically stitched together to form a video sequence.

Specifically, in a Locate Target Step 705, a target to be tracked is located in video data presented in Main Video Display 305. This video is typically generated using a first member of Cameras 105, for example, Camera 105E as illustrated in FIG. 5.

In an Observe Target Step 710 the target is observed using Video Tracking Interface 300. Often the target will eventually leave the field of view of the first member of Cameras 105.

When the target leaves the field of view of the first member, a user selects a second member of Cameras 105 using one of User Controls 310, in a Select Camera Step 715. In some embodiments, the user can make this selection by choosing the member of User Controls 310 closest to the edge of Main Video Display 305 through which the target left the field of view of the first member of Cameras 105. For example, if the target leaves the field of view through the upper left edge, the user may select User Control 310G.

In a View Video Data Step 720, video data generated using the member of Cameras 105 selected in Select Camera Step 715, i.e., the second member, is viewed in Main Video Display 305.

In an optional Stitch Video Data Step 725, the viewed video data generated using the first and second members of Cameras 105 is stitched together to form a video sequence.

In an optional Observe Target Step 730 the target is observed in the video data generated using the second member of Cameras 105. Often the target will eventually leave the field of view of the second member of Cameras 105. When the target leaves the field of view of the second member of Cameras 105, the user may select a third member of Cameras 105 using one of User Controls 310, in a Select Camera Step 735. This selection can be made in manners similar to those described above with respect to Select Camera Step 715.

In an optional View Video Data Step 740, video data generated using the third member of Cameras 105 is viewed in Main Video Display 305.

When video data is viewed backwards in time, the target may be observed entering fields of view rather than leaving fields of view. Further, as discussed elsewhere herein, the various video data viewed in the steps illustrated in FIG. 7 may be temporally synchronized. This synchronization may include use of a synchronization offset based on an estimated time for a target to travel between camera fields of view.

Figure 8:
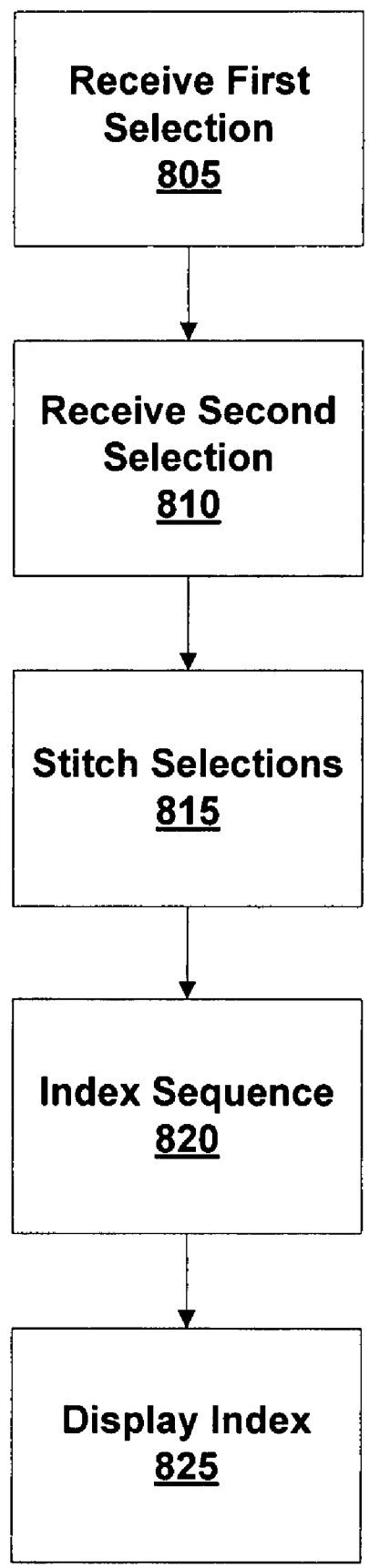
FIG. 8 illustrates methods of stitching video data, according to various embodiments of the invention.

FIG. 8 illustrates methods of stitching video data, according to various embodiments of the invention. In these methods, video data is selected by a user, for example using User Controls 310, and automatically stitched together to form a video sequence. The video sequence is typically chronological in time and may be indexed based on sources of the video data.

Specifically, in a Receive First Selection Step 805, a user selection of first video data, generated using a first member of Cameras 105, is received. Typically, the first video data includes a first time reference and camera identifying information. The user selection is optionally made using a member of User Controls 310.

In a Receive Second Selection Step 810, a user selection of second video data, generated using a second member of Cameras 105, is received. Typically, the second video data includes a second time reference and camera identifying information. The user selection is optionally made using a member of User Controls 310.

In a Stitch Selections Step 815, the first video data and the second video data are stitched together to form a chronological video sequence. Stitch Selections Step 815 is optionally performed automatically in response to the selection received in Receive Second Selection Step 810. Stitch Selections Step 815 optionally makes use of a temporal offset, as described elsewhere herein. Thus, the video sequence can either be temporally contiguous or include a temporal offset between video data. The video sequence may be stored as a single set of video data in Video Data Storage 220, or may be stored as a set of pointers to video data. The video sequence may include a timer reversal.

In an optional Index Sequence Step 820, the video sequence formed in Stitch Selections Step 815 is indexed. This index may be based on the first or second time references, notes provided by a user, thumbnails created by the user using Create Thumbnail Control 545, or the identities of the first and second members of Cameras 105. In some embodiments, the index is associated with thumbnails of the video data included in the video sequence. Stitch Selections Step 815 and Index Sequence Step 820 are optionally performed using Stitching Logic 245. Index Sequence Step 820 is optionally automatically performed in response to a selection of one of User Controls 310.

Several embodiments are specifically illustrated and/or described herein. However, it will be appreciated that modifications and variations are covered by the above teachings and within the scope of the appended claims without departing from the spirit and intended scope thereof. For example, Video Tracking System 200 may include an automatic mode in which a target is automatically tracked from the viewpoint of one of Cameras 105 to another of Cameras 105 based on target identification. For example, target identification technology disclosed in U.S. patent application Ser. No. 11/229,091, filed Sep. 16, 2005 and entitled "Robust Perceptual Color Identification" may be used to identify a target. Video Tracking System 200 may further be configured to store a catalog of targets and/or index video data including specific targets. Video Tracking System 200 may be configured to work with audio as will as video data. Various embodiments of the invention include computing instructions stored on computer readable media and configured for performing methods of the invention.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

The invention claimed is:

1. A method comprising:
   identifying a first member of a plurality of cameras;
   identifying a first topological relationship between the first member of the plurality of cameras and a second member of the plurality of cameras;
   identifying a second topological relationship between the first member of the plurality of cameras and a third member of the plurality of cameras, the first topological relationship and the second topological relationship being relative to a viewpoint of the first camera;
   presenting video data generated using the first member of the plurality of cameras in a user interface, the user interface including a first user control and a second user control;
   associating the second member of the plurality of cameras with the first user control based on the topological relationship between the first member of the plurality of cameras and the second member of the plurality of cameras;
   associating the third member of the plurality of cameras with the second user control based on the topological relationship between the first member of the plurality of cameras and the third member of the plurality of cameras;
   receiving a user selection of the first user control;
   presenting video data generated using the second member of the plurality of cameras in the user interface based on the received user selection;
   associating the first user control and the second user control with members of the plurality of cameras based on topological relationships relative to a viewpoint of the second member of the plurality of cameras; and
   presenting the first user control and the second user control in the user interface in positions representative of the first topological relationship and the second topological relationship, where in the first user control and the second user control are presented in positions around a presentation of the video data generated using the first member of the plurality of cameras.

2. The method of claim 1, further including converting the video data generated using the first member of the plurality of cameras from a first format to a second format and storing the video data generated using the first member of the plurality of cameras in association with information identifying the first member of the plurality of cameras.

3. The method of claim 1, further including stitching the video data generated using the first member of the plurality of cameras to the video data generated using the second member of the plurality of cameras, responsive to receiving the user selection.

4. The method of claim 3, further including presenting thumbnails configured to index the stitched video data in the user interface.

5. A method comprising:
   viewing first video data within a user interface, the first video data generated using a first member of a plurality of cameras;
   locating a target within the first video data;
   observing the target leave a field of view of the first member of the plurality of cameras in a first direction relative to a viewpoint of the first member of the plurality of cameras, or observing the target enter the field of view of the first member of the plurality of cameras from the first direction relative to the viewpoint of the first member of the plurality of cameras;
   selecting a second member of the plurality of cameras using a first user control associated with the first direction relative to the viewpoint of the first member of the plurality of cameras;
   viewing second video data within the user interface, the second video data generated using the second member of the plurality of cameras; and
   automatically stitching the first video data and the second video data to form a video sequence using a temporal offset to automatically stitch the first video data and the second video data, the temporal offset being based on an estimated time of travel of the target.

6. The method of claim 5, wherein the second video data is automatically stitched to the first video data in response to selecting the second member of the plurality of cameras.

7. The method of claim 5 wherein locating the target within the first video data includes locating the target in video data presented in a main video display.

8. The method of claim 7 wherein selecting the second member of the plurality of cameras using the first user control includes selecting a user control closest to an edge of the main video display through which the target left the field of view of the first member of the plurality of cameras.

* * * * *

US 7,777,783 C1

(12) INTER PARTES REEXAMINATION CERTIFICATE (1232nd)
United States Patent
Chin et al.

(10) Number: US 7,777,783 C1
(45) Certificate Issued: Feb. 16, 2016

(54) MULTI-VIDEO NAVIGATION

(75) Inventors: Hu Chin, Fremont, CA (US); Ken Prayoon Cheng, Saratoga, CA (US)

(73) Assignee: PROXIMEX CORPORATION

Reexamination Request:
No. 95/001,525, Jan. 21, 2011

Reexamination Certificate for:
Patent No.: 7,777,783
Issued: Aug. 17, 2010
Appl. No.: 11/726,879
Filed: Mar. 23, 2007

(51) Int. Cl.
*H04N 5/232* (2006.01)
*H04N 7/18* (2006.01)
*G08B 13/196* (2006.01)

(52) U.S. Cl.
CPC ...... *H04N 5/23203* (2013.01); *G08B 13/19602* (2013.01); *H04N 7/181* (2013.01)

(58) Field of Classification Search
CPC .............. H04N 5/232; H04N 5/23203; H04N 5/23206; H04N 7/15; H04N 7/142; H04N 7/147; H04N 7/141; H04N 7/148; H04N 7/152; G08B 13/19302; G08B 13/19634; G08B 13/19641; G08B 13/19645

USPC .......................... 348/14.01–14.16, 143–159, 348/211.11–211.14, 211.99
See application file for complete search history.

(56) References Cited

To view the complete listing of prior art documents cited during the proceeding for Reexamination Control Number 95/001,525, please refer to the USPTO's public Patent Application Information Retrieval (PAIR) system under the Display References tab.

*Primary Examiner* — Henry Tran

(57) ABSTRACT

A video tracking system includes a user interface configured to facilitate tracking of a target between video cameras. The user interface includes user controls configured to assist a user in selecting video cameras as the target moves between fields of view of the video cameras. These user controls are automatically associated with specific cameras based on a camera topology relative to a point of view of a camera whose video data is currently being viewed. The video tracking system further includes systems and methods of synchronizing video data generated using the video cameras and of automatically generating a stitched video sequence based on the user selection of video cameras. The target may be tracked in real-time or in previously recorded video and may be track forward or backwards in time.

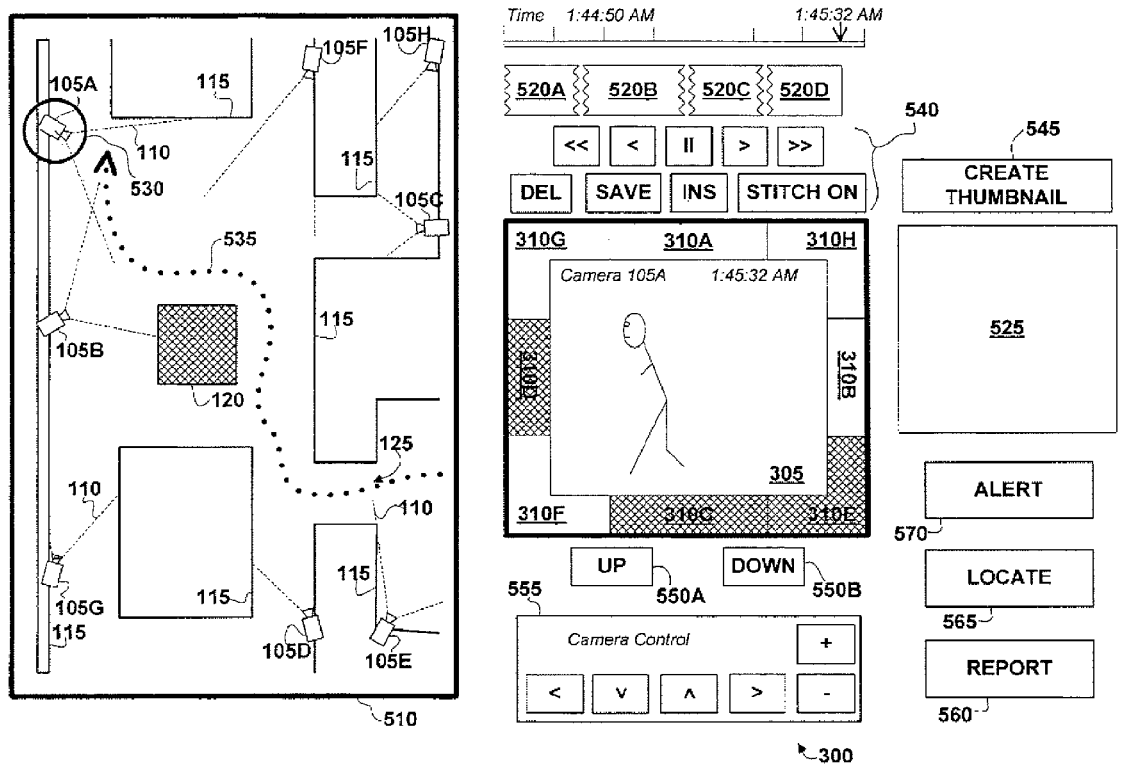

US 7,777,783 C1

INTER PARTES
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-8 are cancelled.

New claims 9-24 are added and determined to be patentable.

9. *A method comprising:*
*identifying a first member of a plurality of cameras;*
*identifying a first topological relationship between the first member of the plurality of cameras and a second member of the plurality of cameras;*
*identifying a second topological relationship between the first member of the plurality of cameras and a third member of the plurality of cameras, the first topological relationship and the second topological relationship being relative to a viewpoint of the first camera;*
*presenting video data generated using the first member of the plurality of cameras in a user interface, the user interface including a first user control and a second user control;*
*associating the second member of the plurality of cameras with the first user control based on the topological relationship between the first member of the plurality of cameras and the second member of the plurality of cameras;*
*associating the third member of the plurality of cameras with the second user control based on the topological relationship between the first member of the plurality of cameras and the third member of the plurality of cameras;*
*receiving a user selection of the first user control;*
*presenting video data generated using the second member of the plurality of cameras in the user interface based on the received user selection;*
*associating the first user control and the second user control with members of the plurality of cameras based on topological relationships relative to a viewpoint of the second member of the plurality of cameras;*
*presenting the first user control and the second user control in the user interface in positions representative of the first topological relationship and the second topological relationship, wherein the first user control and the second user control are presented in positions around a presentation of the video data generated using the first member of the plurality of cameras; and*
*associating the third member of the plurality of cameras with the first user control such that both the second and third members of the plurality of cameras are associated with the first user control at the same time.*

10. *The method of claim 9 further comprising presenting a list in the user interface, responsive to the user selection of the first user control, the list including the second and third members of the plurality of cameras.*

11. *The method of claim 10 wherein the list comprises a group of thumbnail images including a thumbnail image for each of the second and third members of the plurality of cameras.*

12. *A method comprising:*
*viewing first video data within a user interface, the first video data generated using a first member of a plurality of cameras;*
*locating a target within the first video data*
*observing the target leave a field of view of the first member of the plurality of cameras in a first direction relative to a viewpoint of the first member of the plurality of cameras, or observing the target enter the field of view of the first member of the plurality of cameras from the first direction relative to the viewpoint of the first member of the plurality of cameras;*
*selecting a second member of the plurality of cameras using a first user control associated with the first direction relative to the viewpoint of the first member of the plurality of cameras;*
*viewing second video data within the user interface, the second video data generated using the second member of the plurality of cameras; and*
*automatically stitching the first video data and the second video data to form a video sequence using a temporal offset to automatically stitch the first video data and the second video data, the temporal offset being based on an estimated time of travel of the target,*
*wherein the video sequence includes a copy of the first video data and the second video data in a sequential video file.*

13. *The method of claim 12 wherein the copy of the first video data is time reversed.*

14. *A method comprising:*
*identifying a first member of a plurality of cameras;*
*identifying a first topological relationship between the first member of the plurality of cameras and a second member of the plurality of cameras;*
*identifying a second topological relationship between the first member of the plurality of cameras and a third member of the plurality of cameras, the first topological relationship and the second topological relationship being relative to a viewpoint of the first camera;*
*presenting video data generated using the first member of the plurality of cameras in a user interface, the user interface including a first user control and a second user control;*
*associating the second member of the plurality of cameras with the first user control based on the topological relationship between the first member of the plurality of cameras and the second member of the plurality of cameras;*
*associating the third member of the plurality of cameras with the second user control based on the topological relationship between the first member of the plurality of cameras and the third member of the plurality of cameras;*
*receiving a user selection of the first user control;*
*presenting video data generated using the second member of the plurality of cameras in the user interface based on the received user selection;*
*associating the first user control and the second user control with members of the plurality of cameras based on topological relationships relative to a viewpoint of the second member of the plurality of cameras; and* presenting the first user control and the second user control in the user interface in positions representative of the first topological relationship and the second topological relationship, where in the first user control and the second user control are presented in positions around a presentation of the video data generated using the first member of the plurality of cameras; wherein first and second user controls are presented in positions around the presentation of the video data that are relative to the viewpoint of the first member.

15. A method comprising:

identifying a first member of a plurality of cameras;

identifying a first topological relationship between the first member of the plurality of cameras and a second member of the plurality of cameras;

identifying a second topological relationship between the first member of the plurality of cameras and a third member of the plurality of cameras the first topological relationship and the second topological relationship being relative to a viewpoint of the first camera;

presenting video data generated using the first member of the plurality of cameras in a user interface, the user interface including a first user control and a second user control;

associating the second member of the plurality of cameras with the first user control based on the topological relationship between the first member of the plurality of cameras and the second member of the plurality of cameras;

associating the third member of the plurality of cameras with the second user control based on the topological relationship between the first member of the plurality of cameras and the third member of the plurality of cameras;

receiving a user selection of the first user control;

presenting video data generated using the second member of the plurality of cameras in the user interface based on the received user selection;

associating the first user control and the second user control with members of the plurality of cameras based on topological relationships relative to a viewpoint of the second member of the plurality of cameras;

presenting the first user control and the second user control in the user interface in positions representative of the first topological relationship and the second topological relationship, where in the first user control and the second user control are presented in positions around a presentation of the video data generated using the first member of the plurality of cameras; and receiving a user selection of the second user control, re-associating the first and second user controls based on a viewpoint of the third member with new members.

16. A method comprising:

identifying a first member of a plurality of cameras;

identifying a first topological relationship between the first member of the plurality of cameras and a second member of the plurality of cameras;

identifying a second topological relationship between the first member of the plurality of cameras and a third member of the plurality of cameras, the first topological relationship and the second topological relationship being relative to a viewpoint of the first camera;

presenting video data generated using the first member of the plurality of cameras in a user interface, the user interface including a first user control and a second user control;

associating the second member of the plurality of cameras with the first user control based on the topological relationship between the first member of the plurality of cameras and the second member of the plurality of cameras;

associating the third member of the plurality of cameras with the second user control based on the topological relationship between the first member of the plurality of cameras and the third member of the plurality of cameras;

receiving a user selection of the first user control;

presenting video data generated using the second member of the plurality of cameras in the user interface based on the received user selection;

associating the first user control and the second user control with members of the plurality of cameras based on topological relationships relative to a viewpoint of the second member of the plurality of cameras;

presenting the first user control and the second user control in the user interface in positions representative of the first topological relationship and the second topological relationship, where in the first user control and the second user control are presented in positions around a presentation of the video data generated using the first member of the plurality of cameras; and generating a report that includes video sequences and thumbnails from the plurality of cameras.

17. A method comprising:

identifying a first member of a plurality of cameras:

identifying, a first topological relationship between the first member of the plurality of cameras and a second member of the plurality of cameras;

identifying a second topological relationship between the first member of the plurality of cameras and a third member of the plurality of cameras, the first topological relationship and the second topological relationship being relative to a viewpoint of the first camera;

presenting video data generated using the first member of the plurality of cameras in a user interface, the user interface including a first user control and a second user control;

associating the second member of the plurality of cameras with the first user control based on the topological relationship between the first member of the plurality of cameras and the second member of the plurality of cameras;

associating the third member of the plurality of cameras with the second user control based on the topological relationship between the first member of the plurality of cameras and the third member of the plurality of cameras;

receiving a user selection of the first user control;

presenting video data generated using the second member of the plurality of cameras in the user interface based on the received user selection;

associating the first user control and the second user control with members of the plurality cameras based on topological relationships relative to a viewpoint of the second member of the plurality of cameras;

presenting the first user control and the second user control in the user interface in positions representative of the first topological relationship and the second topological relationship, where in the first user control and the second user control are presented in positions around a presentation of the video data generated using the first member of the plurality of cameras; and generating a report based on a template, the report including a thumbnail from a camera and permitting a user to add notes to the report.

18. A method comprising:

identifying a first member of a plurality of cameras;

identifying a first topological relationship between the first member of the plurality of cameras and a second member of the plurality of cameras;

identifying a second topological relationship between the first member of the plurality of cameras and a third member of the plurality of cameras, the first topological relationship and the second topological relationship being relative to a viewpoint of the first camera;

presenting video data generated using the first member of the plurality of cameras in a user interface, the user interface including a first user control and a second user control;

associating the second member of the plurality of cameras with the first user control based on the topological relationship between the first member of the plurality of cameras and the second member of the plurality of cameras;

associating the third member of the plurality of cameras with the second user control based on the topological relationship between the first member of the plurality of cameras and the third member of the plurality of cameras;

receiving a user selection of the first user control;

presenting video data generated using the second member of the plurality of cameras in the user interface based on the received user selection;

associating the first user control and the second user control with members of the plurality of cameras based on topological relationships relative to a viewpoint of the second member of the plurality of cameras;

presenting the first user control and the second user control in the user interface in positions representative of the first topological relationship and the second topological relationship, where in the first user control and the second user control are presented in positions around a presentation of the video data generated using the first member of the plurality of cameras; and wherein at least one of the cameras represents a portable member, the method further comprising determining a location of the portable member.

19. A method comprising:

identifying a first member of a plurality of cameras;

identifying a first topological relationship between the first member of the plurality of cameras and a second member of the plurality of cameras;

identifying a second topological relationship between the first member of the plurality of cameras and a third member of the plurality of cameras, the first topological relationship and the second topological relationship being relative to a viewpoint of the first camera;

presenting video data generated using the first member of the plurality of cameras in a user interface, the user interface including a first user control and a second user control;

associating the second member of the plurality of cameras with the first user control based on the topological relationship between the first member of the plurality of cameras and the second member of the plurality of cameras;

associating the third member of the plurality of cameras with the second user control based on the topological relationship between the first member of the plurality of cameras and the third member of the plurality of cameras;

receiving a user selection of the first user control;

presenting video data generated using the second member of the plurality of cameras in the user interface based on the received user selection;

associating the first user control and the second user control with members of the plurality of cameras based on topological relationships relative to a viewpoint of the second member of the plurality of cameras;

presenting the first user control and the second user control in the user interface in positions representative of the first topological relationship and the second topological relationship, where in the first user control and the second user control are presented in positions around a presentation of the video data generated using the first member of the plurality of cameras; and generating a report that includes a listing of areas through which a target travels based on which members of the cameras are selected to track the target.

20. A method comprising:

identifying a first member of a plurality of cameras;

identifying a first topological relationship between the first member of the plurality of cameras and a second member of the plurality of cameras;

identifying a second topological relationship between the first member of the plurality of cameras and a third member of the plurality of cameras, the first topological relationship and the second topological relationship being relative to a viewpoint of the first camera;

presenting video data generated using the first member of the plurality of cameras in a user interface, the user interface including a first user control and a second user control;

associating the second member of the plurality of cameras with the first user control based on the topological relationship between the first member of the plurality of cameras and the second member of the plurality of cameras;

associating the third member of the plurality of cameras with the second user control based on the topological relationship between the first member of the plurality of cameras and the third member of the plurality of cameras;

receiving a user selection of the first user control;

presenting video data generated using the second member of the plurality of cameras in the user interface based on the received user selection;

associating the first user control and the second user control with members of the plurality of cameras based on topological relationships relative to a viewpoint of the second member of the plurality of cameras; and presenting the first user control and the second user control in the user interface in positions representative of the first topological relationship and the second topological relationship, where in the first user control and the second user control are presented in positions around a presentation of the video data generated using the first member of the plurality of cameras, wherein the method is utilized to track a target using stairs, the first and second user controls being associated with members of the plurality of cameras that track the target moving upstairs and downstairs, respectively.

21. A method comprising:
identifying a first member of a plurality of cameras;
identifying a first topological relationship between the first member of the plurality of cameras and a second member of the plurality of cameras;
identifying a second topological relationship between the first member of the plurality of cameras and a third member of the plurality of cameras, the first topological relationship and the second topological relationship being relative to a viewpoint of the first camera;
presenting video data generated using the first member of the plurality of cameras in a user interface, the user interface including a first user control and a second user control;
associating the second member of the plurality of cameras with the first user control based on the topological relationship between the first member of the plurality of cameras and the second member of the plurality of cameras;
associating the third member of the plurality of cameras with the second user control based on the topological relationship between the first member of the plurality of cameras and the third member of the plurality of cameras;
receiving a user selection of the first user control;
presenting video data generated using the second member of the plurality of cameras in the user interface based on the received user selection;
associating the first user control and the second user control with members of the plurality of cameras based on topological relationships relative to a viewpoint of the second member of the plurality of cameras; and
presenting the first user control and the second user control in the user interface in positions representative of the first topological relationship and the second topological relationship, where in the first user control and the second user control are presented in positions around a presentation of the video data generated using the first member of the plurality of cameras; wherein the first and second user controls represent physical buttons on the user interface.

22. A method comprising:
identifying a first member of a plurality of cameras;
identifying a first topological relationship between the first member of the plurality of cameras and a second member of the plurality of cameras;
identifying a second topological relationship between the first member of the plurality of cameras and a third member of the plurality of cameras, the first topological relationship and the second topological relationship being relative to a viewpoint of the first camera;
presenting video data generated using the first member of the plurality of cameras in a user interface, the user interface including a first user control and a second user control;
associating the second member of the plurality of cameras with the first user control based on the topological relationship between the first member of the plurality of cameras and the second member of the plurality of cameras;
associating the third member of the plurality of cameras with the second user control based on the topological relationship between the first member of the plurality of cameras and the third member of the plurality of cameras;
receiving a user selection of the first user control;
presenting video data generated using the second member of the plurality of cameras in the user interface based on the received user selection;
associating the first user control and the second user control with members of the plurality of cameras based on topological relationships relative to a viewpoint of the second member of the plurality of cameras; and
presenting the first user control and the second user control in the user interface in positions representative of the first topological relationship and the second topological relationship, where in the first user control and the second user control are presented in positions around a presentation of the video data generated using the first member of the plurality of cameras; wherein, when a cursor is moved over one of the user controls, displaying video data generated using the associated member.

23. A method comprising:
identifying a first member of a plurality of cameras;
identifying a first topological relationship between the first member of the plurality of cameras and a second member of the plurality of cameras;
identifying a second topological relationship between the first member of the plurality of cameras and a third member of the plurality of cameras, the first topological relationship and the second topological relationship being relative to a viewpoint of the first camera;
presenting video data generated using the first member of the plurality of cameras in a user interface, the user interface including a first user control and a second user control;
associating the second member of the plurality of cameras with the first user control based on the topological relationship between the first member of the plurality of cameras and the second member of the plurality of cameras;
associating the third member of the plurality of cameras with the second user control based on the topological relationship between the first member of the plurality of cameras and the third member of the plurality of cameras;
receiving a user selection of the first user control;
presenting video data generated using the second member of the plurality of cameras in the user interface based on the received user selection;
associating the first user control and the second user control with members of the plurality of cameras based on topological relationships relative to a viewpoint of the second member of the plurality of cameras;
presenting the first user control and the second user control in the user interface in positions representative of the first topological relationship and the second topological relationship, where in the first user control and the second user control are presented in positions around a presentation of the video data generated using the first member of the plurality of cameras; and
storing the video data from the plurality of cameras before the presenting operations such that the presenting and associating operations are performed to track a target using previously recorded non-live video data.

24. A method comprising:
identifying a first member of a plurality of cameras;
identifying a first topological relationship between the first member of the plurality of cameras and a second member of the plurality of cameras;

identifying a second topological relationship between the first member of the plurality of cameras and a third member of the plurality of cameras, the first topological relationship and the second topological relationship being relative to a viewpoint of the first camera;

presenting video data generated using the first member of the plurality of cameras in a user interface, the user interface including a first user control and a second user control;

associating the second member of the plurality of cameras with the first user control based on the topological relationship between the first member of the plurality of cameras and the second member of the plurality of cameras;

associating the third member of the plurality of cameras with the second user control based on the topological relationship between the first member of the plurality of cameras and the third member of the plurality of cameras;

receiving a user selection of the first user control;

presenting video data generated using the second member of the plurality of cameras in the user interface based on the received user selection;

associating the first user control and the second user control with members of the plurality of cameras based on topological relationship relative to a viewpoint of the second member of the plurality of cameras;

presenting the first user control and the second user control in the user interface in positions representative of the first topological relationship and the second topological relationship, where in the first user control and the second user control are presented in positions around a presentation of the video data generated using the first member of the plurality of cameras; and moving between the video data presented on the user interface from different members in a time synchronized manner such that, when a user selects to switch from viewing pre-recorded video data recorded at a prior point in time to a new selected member, the video data recorded by the new selected member is presented corresponding to the prior point in time.

* * * * *